United States Patent
Wieland

(10) Patent No.: US 8,304,474 B2
(45) Date of Patent: Nov. 6, 2012

(54) TWO-COMPONENT MORTAR COMPOUND AND ITS USE

(75) Inventor: Philipp Wieland, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/932,305

(22) Filed: Feb. 23, 2011

(65) Prior Publication Data

US 2011/0313083 A1    Dec. 22, 2011

(30) Foreign Application Priority Data

Feb. 24, 2010    (DE) .......................... 10 2010 008 971

(51) Int. Cl.
  *C08K 3/00*    (2006.01)
  *C08K 3/34*    (2006.01)
(52) U.S. Cl. ........................................... 524/2; 524/442
(58) Field of Classification Search ........................ 524/2
  See application file for complete search history.

(56) References Cited

U.S. PATENT DOCUMENTS 7,238,749 B2 *    7/2007    Buergel et al. ................ 525/257
2006/0169183 A1 *    8/2006    Waser .......................... 106/802
2010/0294676 A1    11/2010    Gruen et al. .................. 206/223
2011/0313083 A1    12/2011    Wieland .......................... 524/2

FOREIGN PATENT DOCUMENTS

DE    19911038    9/2000
DE    10 2010 008 971 A1    8/2011
WO    WO 2008/058588    5/2008

* cited by examiner

*Primary Examiner* — Hui Chin
(74) *Attorney, Agent, or Firm* — Davidson, Davidson & Kappel, LLC

(57) ABSTRACT

A two-component mortar compound including a curable resin component (A) that contains 30% to 45% by weight of at least one radically polymerizable resin, 30% to 45% by weight of fillers, 15% to 25% by weight of cement and 1% to 8% of a thickeners, and including a separately arranged so as to inhibit reaction curing component (B) that contains 1% to 20% by weight of a peroxide, 10% to 35% by weight of water, 40% to 80% by weight of fillers and 0.5% to 5% by weight of thickeners, with the proviso that the sum of the quantities of the constituents of the resin component or of the curing component is always 100% by weight, which is characterized in that the resin component (A) contains 0.01% to 5% by weight of an organic and/or inorganic acid and/or salts and esters thereof.

17 Claims, No Drawings

TWO-COMPONENT MORTAR COMPOUND AND ITS USE

This claims the benefit of German Patent Application DE 10 2010 008 971.0 filed Feb. 24, 2010 and hereby incorporated by reference herein.

The subject matter of the invention is a two-component mortar compound comprising a curable resin component (A) that contains 30% to 45% by weight of at least one radically polymerizable resin, 30% to 45% by weight of fillers, 15% to 25% by weight of cement and 1% to 8% of thickeners, and comprising a separately arranged so as to inhibit reaction curing component (B) that contains 1% to 20% by weight of a peroxide, 10% to 35% by weight of water, 0.40% to 80% by weight of fillers and 0.5% to 5% by weight of thickeners, with the proviso that the sum of the quantities of the constituents of the resin component or of the curing component is always 100% by weight, and the invention also relates to its use to fasten anchoring means into drilled holes in mineral substrates by means of the chemical reaction of the resin component (A) with the curing component (B).

BACKGROUND

The resin components of two-component mortar compounds, which are also referred to as chemical plugging compounds, generally consist of an organic resin matrix, that is to say, a curable resin component, and a separately arranged so as to inhibit reaction curing component. In addition to the at least one radically polymerizable resin, the resin component normally contains inorganic fillers such as sand, cement, thickeners and the like. For cost reasons as well as in order to improve the performance, it is often desirable here to achieve the highest possible filler content of the organic matrix, that is to say, a high filler content in the resin component. A problem that arises in this context is that, generally speaking, the higher the filler content of the resin component, the greater the force needed to press out the ready-to-use mortar compound, which causes difficulties for the user (quick onset of fatigue in case of manual operation of the pressing device) as well as for the pressing devices (reduced service life due to high forces).

Conventional methods for reducing the forces needed to press out a given filler content of a resin component include, for example, reducing the thickener content, or systematically introducing air bubbles of a defined size and distribution into the resin component (see WO 2008/058588).

SUMMARY OF THE INVENTION

A reduction in the thickener content of the resin component, however, often results in a sharp drop in the total viscosity which, in turn, can lead to problems during the use of the mortar compound, namely, during overhead use. The systematic introduction of air bubbles into the resin component, in turn, can reduce the bonding capacity of the products since the compressive strength of the composite material created by the curing can be diminished.

It is an object of the present invention is to lower the forces needed to press out highly filled two-component mortar compounds without having to accept the above-mentioned drawbacks of the state of the art.

It has been surprisingly found that this objective can be achieved by adding small amounts of an organic and/or inorganic acid and/or salts and esters thereof to the resin component of the two-component mortar compound.

Therefore, the invention relates to the two-component mortar compound. The subordinate claims relate to preferred embodiments of this inventive subject matter as well as to the use of the above-mentioned two-component mortar compound for fastening anchoring means such as anchor rods and the like into drilled holes in mineral substrates such as, for instance, concrete, bricks or natural stone by means of the chemical reaction of the resin component with the curing component.

DETAILED DESCRIPTION

Thus, the invention relates to a two-component mortar compound comprising a curable resin component (A) containing 30% to 45% by weight of at least one radically polymerizable resin, 30% to 45% by weight of fillers, 15% to 25% by weight of cement and 1% to 8% of thickeners, and comprising a separately arranged so as to inhibit reaction curing component (B) containing 1% to 20% by weight of a peroxide, 10% to 35% by weight of water, 40% to 80% by weight of fillers and 0.5% to 5% by weight of thickeners, with the proviso that the sum of the quantities of the constituents of the resin component or of the curing component is always 100% by weight, which is characterized in that the resin component (A) contains 0.01% to 5% by weight of an organic and/or inorganic acid and/or salts and esters thereof.

As the inorganic acid, the resin component (A) preferably contains an inorganic Lewis acid, preferably a compound selected from the group comprising phosphoric acid ($H_3PO_4$), a primary phosphate having the formula $M^I H_2 PO_4$, a secondary phosphate having the formula $M^I_2 HPO_4$, an oligophosphoric acid having the formula $M^I_{n+2} P_n O_{3n+1}$ or $M^I_n H_2 P_n O_{3n+1}$, wherein n has a value from 2 to 10; a polyphosphoric acid having the formula $M^I_{n+2} P_n O_{3n+1}$ or $M^I_n H_2 P_n O_{3n+1}$ wherein n has a value >10, phosphorous acid ($H_3PO_3$), a primary phosphonate having the formula $M^I H_2 PO_3$, a secondary phosphonate having the formula $M^I_2 HPO_3$, wherein $M^I$ stands for a monovalent metal equivalent, compounds having the formula $Si(OH)_4$, $Al(OH)_3$, $H_3BO_3$, $H_3AsO_3$, $As_2O_3$, $H_3SbO_3$, $H_3SbO_4$, $Sb_2O_3$, $FeCl_3$, $CuCl_2$ and $ZnCl_2$ and mixtures thereof.

As the monovalent metal equivalent $M^I$, preference is given to monovalent metal equivalents of the alkali and earth alkali metals such as lithium, sodium, potassium, magnesium and calcium.

According to a preferred embodiment, the resin component (A) of the two-component mortar compound according to the invention contains, as the organic acid, a compound selected from the group comprising aliphatic and aromatic carboxylic acids, organic aliphatic and aromatic phosphoric acids, organic aliphatic and aromatic phosphonic acids, organic aliphatic and aromatic sulfonic acids and salts thereof.

As aliphatic and/or aromatic carboxylic acids, special preference is given to formic acid, acetic acid, propionic acid, oxalic acid, malonic acid, succinic acid, lactic acid, pyruvic acid, citric acid, fumaric acid, maleic acid, benzoic acid, salicylic acid, phthalic acid, terephthalic acid as well as salts thereof; as organic aliphatic phosphoric acids, special preference is given to a phosphoric acid ester such as, for example, hydroxy ethyl methacrylate phosphate (HEMAphosphate); as aliphatic phosphonic acids, special preference is given to vinyl phosphonic acid as well as salts thereof; and as aliphatic and aromatic sulfonic acids, special preference is given to methane sulfonic acid, benzene sulfonic acid, p-toluene sulfonic acid, sulfanilic acid as well as salts thereof.

As salts of the above-mentioned acids, preference is given especially to the alkali metal and earth alkali metal salts, namely, the lithium, sodium, potassium, magnesium and calcium salts.

Preferably, the resin component (A) contains the organic and/or inorganic acid and/or salts and esters thereof in a quantity of 0.01% to 2.0% by weight, even more preferably in a quantity of 0.05% to 1.0% by weight.

Advantageously, the resin component (A) of the two-component mortar compound according to the invention contains, as the radically polymerizable resin, at least one representative from the group comprising unsaturated polyester resins, vinyl ester resins and vinyl ester urethane resins. Here, as the vinyl ester resin, preference is given to an addition product of polyepoxides with unsaturated monocarboxylic acids, preferably a vinyl ester resin on the basis of bisphenol A, a vinyl ester resin of an epoxy novolak resin and (meth)acrylic acid or an esterification product of optionally alkoxylated bisphenol A with (meth)acrylic acid; as the vinyl ester urethane resin, preference is given to a urethane methacrylate resin or a urethane dimethacrylate resin; and as the unsaturated polyester resin, preference is given to an unsaturated polyester resin on the basis of o-phthalic acid and/or iso-phthalic acid, maleic acid or fumaric acid as a dicarboxylic acid and low-molecular-weight aliphatic polyols, preferably diols.

According to another preferred embodiment, the resin component (A) of the two-component mortar compound according to the invention can contain 0% to 1% by weight of a polymerization inhibitor such as, for example, a phenolic or free-radical polymerization inhibitor, preferably 4-hydroxy-3,5-di-tert.-butyl toluene, butyl pyrocatechol, hydroquinone and/or 2,2,6,6-tetramethyl piperidinyl-1-oxide or derivatives thereof.

According to another preferred embodiment, the resin component (A) of the two-component mortar compound according to the invention contains 0.1% to 30% by weight of an accelerator, whereby tertiary aromatic amines, toluidines or xylidines are preferred as the accelerators. Especially preferred accelerators are N,N-dimethyl aniline, N,N-diethyl aniline, N,N-dimethyl-p-toluidine, N,N-bis(hydroxy ethyl)-p-toluidine, N,N-bis(hydroxy propyl)-p-toluidine, N,N-bis(hydroxy ethyl)-m-toluidine and/or N-bis(2-hydroxy ethyl)-xylidine.

Preferably, the curing component (B) of the two-component mortar compound contains 1% to 20% by weight of a peroxide, 10% to 35% by weight of water, 40% to 80% by weight of fillers and 0.5% to 5% by weight of thickeners.

The peroxide is preferably contained in the curing component (B) in a quantity of 0.5% to 10% by weight, preferably 3% to 8% by weight, relative to the radically polymerizable resin.

According to an advantageous embodiment of the invention, as the peroxide, the curing component (B) of the two-component mortar compound according to the invention contains dibenzoyl peroxide, methyl ethyl ketone peroxide, tert.-butyl perbenzoate, cyclohexanon peroxide, lauroyl peroxide, cumene hydroperoxide and/or tert.-butyl peroxy-2-ethyl hexanoate.

An especially preferred curing component (B) of the two-component mortar compound according to the invention contains 30% to 40% by weight of an aqueous dispersion of benzoyl peroxide, 40% to 80% by weight of quartz powder, 15% to 25% by weight of aluminum oxide, and 0.1% to 3% by weight of pyrogenic silicic acid.

As the fillers, the resin component (A) as well as the curing component (B) of the two-component mortar compound according to the invention can contain quartz, pyrogenic silicic acid, glass, silicates, aluminosilicates, aluminum oxide, corundum, porcelain, stoneware, heavy spar, light spar, talcum and/or chalk, whereby these fillers have a particle size that is suitable for the application according to the invention and that is generally well-known to the person skilled in the art.

As the thickeners, the resin component (A) and/or the curing component (B) of the two-component mortar compound according to the invention can contain layer silicates such as bentonite or smectite, pyrogenic silicic acid and/or organic substances such as amide waxes, urea derivatives or castor oil derivatives.

The two-component mortar compound according to the invention comprises a curable resin component (A) and the separately arranged, reaction-inhibiting curing component (B) in different containers, for example, in a multi-chamber device such as a multi-chamber cartridge and/or magazine from which containers the two components are pressed out and mixed due to the effect of mechanical pressing forces or under the effect of a gas pressure. Preferably, such cartridge systems or injection systems in which the two components are pressed out of the separate containers and fed through a static mixer in which they are homogeneously mixed and then discharged through a nozzle, preferably directly into the drilled hole. With this application of the two-component mortar compound according to the invention, the reduction of the pressing force can be seen particularly well.

It has been found that, due to the presence of the organic and/or inorganic acid or of the salts and esters thereof in the resin component (A) in comparison to the same mortar compound without organic and/or inorganic acid in the resin component (A), the two-component mortar compound according to the invention requires far lower pressing forces to press the mortar compound out of the containers containing the mixture, without the viscosity of the mortar compound being lowered. In this manner, problems, for example, during overhead use, can be ruled out. Moreover, the incorporation of air is avoided which, as already explained, can reduce the bonding capacity of the cured mortar compound.

Therefore, the subject matter of the invention is also a method for using the two-component mortar compound according to the invention for fastening anchoring means such as anchor rods and the like into drilled holes in different types of mineral substrates, that is to say, for instance, substrates on the basis of concrete, aerated concrete, bricks, lime sandstone, sandstone, natural stone or the like, by means of the chemical reaction of the resin component (A) with the curing component (B):

The following example serves to explain the invention, but without limiting it in any way whatsoever.

Example

The resin component (A) for Comparative Compound 1 and for Compounds 2 and 3 according to the invention were made from the constituents indicated in the table below. The curing compound (B), which was the same for all of the compounds, was made the same manner from the constituents indicated in the table.

The resin component (A) and the curing compound (B) were filled into appropriate rigid cartridges and mixed with a static mixer. Subsequently, the force was measured that is needed to press out the two components at room temperature at a constant advance rate through the static mixer. Here, the pressing force was measured on a Zwick tensile testing machine.

Moreover, the viscosity of the obtained mortar compounds was measured.

Finally, the strength properties of the cured compounds was examined by measuring the shear strength. For this purpose, the mortar compound that had been mixed in a static mixer and that consisted of the resin component (A) and the curing component (B) was placed into a steel sleeve with a 10-mm inner thread. A threaded rod of size M8 was inserted into the uncured mortar compound and affixed so as to be centered. After the curing of the mortar compound, a Zwick tensile testing machine was used to measure the force that is needed to pull the anchor rod out of the inner threaded sleeve and subsequently the shear strength in $N/mm_2$ was calculated on this basis.

The obtained numerical values pertaining to the pressing force, the viscosity and the shear strength are likewise given in the table below.

TABLE

|  | Compound 1 (comparison) | Compound 2 | Compound 3 |
|---|---|---|---|
| Resin component (A) | | | |
| Urethane methacrylate resin (% by weight) | 38.0 | 38.0 | 38.0 |
| Quartz sand (% by weight) | 40.0 | 39.9 | 39.7 |
| Cement (% by weight) | 19.0 | 19.0 | 19.0 |
| Pyrogenic silicic acid (% by weight) | 3.0 | 3.0 | 3.0 |
| Boric acid (% by weight) | — | 0.1 | 0.3 |
| Curing component (B) | | | |
| Benzoyl peroxide, aqueous suspension (% by weight) | 35.0 | 35.0 | 35.0 |
| Quartz powder (% by weight) | 44.0 | 44.0 | 44.0 |
| Aluminum oxide (% by weight) | 20.0 | 20.0 | 20.0 |
| Pyrogenic silicic acid (% by weight) | 1.0 | 1.0 | 1.0 |
| Pressing force [N] | 1100 | 1000 | 900 |
| Viscosity [Pas] | 50 | 65 | 60 |
| Shear strength [$N/mm_2$] | 24 | 28 | 27 |

As can be seen in the table above, it turned out that the addition according to the invention of boric acid can lower the force needed to press out the mortar compound while the composition of the compound remains otherwise the same. The pressing force is inversely proportional to the added quantity of boric acid.

The viscosity of the resin component is not lowered by the addition of boric acid. On the contrary, the viscosity of the compound is even slightly raised which, with an eye towards the stability of the ready-to-use plugging compound, is desirable, for example, for overhead use.

It can be seen in the table that, in comparison to Comparative Compound 1, Compounds 2 and 3 according to the invention have a higher viscosity along with a reduced pressing force, which is undoubtedly to be considered as surprising. The table also shows that, through the addition according to the invention of boric acid to the resin component (A), the strength properties are not detrimentally affected impaired, but rather, Compounds 2 and 3 according to the invention have greater shear strength in comparison to the comparative compound.

What is claimed is:

1. A method for providing a two-component mortar compound comprising:
providing 0.01% to 5% by weight of an organic and/or inorganic acid and/or salts and esters thereof in a resin component (A) of the two-component mortar compound to reduce the forces needed to press out the two-component mortar compound, the two-component mortar compound comprising a curable resin component (A) that further contains 30% to 45% by weight of at least one radically polymerizable resin, 30% to 45% by weight of fillers, 15% to 25% by weight of cement and 1% to 8% of a thickener, and comprising a separately arranged so as to inhibit reaction curing component (B) that contains 1% to 20% by weight of a peroxide, 10% to 35% by weight of water, 40% to 80% by weight of fillers and 0.5% to 5% by weight of thickeners, a sum of the quantities of the constituents of the resin component or of the curing component being 100% by weight.

2. The method as recited in claim 1 wherein the inorganic acid is an inorganic Lewis acid.

3. The method as recited in claim 2 wherein the inorganic Lewis acid is a compound selected from the group comprising phosphoric acid ($H_3PO_4$), a primary phosphate having the formula $M^IH_2PO_4$, a secondary phosphate having the formula $M^I_2HPO_4$, an oligophosphoric acid having the formula $M^I_{n+2}P_nO_{3n+1}$ or $M^I_nH_2P_nO_{3n+1}$, wherein n has a value from 2 to 10; a polyphosphoric acid having the formula $M^I_{n+2}P_nO_{3n+1}$ or $M^I_{n+2}H_2P_nO_{3n+1}$, wherein n has a value >10, phosphorous acid ($H_3PO_3$), a primary phosphonate having the formula $M^IH_2PO_3$, a secondary phosphonate having the formula $M^I_2HPO_3$, wherein $M^I$ stands for a monovalent metal equivalent, compounds having the formula $Si(OH)_4$, $Al(OH)_3$, $H_3BO_3$, $H_3AsO_3$, $As_2O_3$, $H_3SbO_3$, $H_3SbO_4$, $Sb_2O_3$, $FeCl_3$, $CuCl_2$ and $ZnCl_2$ and mixtures thereof.

4. The method as recited in claim 1 wherein the organic acid is a compound selected from the group comprising the aliphatic and aromatic carboxylic acids, organic aliphatic and aromatic phosphoric acids, organic aliphatic and aromatic phosphonic acids, organic aliphatic and aromatic sulfonic acids and salts thereof.

5. The method as recited in claim 4 wherein the aliphatic and/or aromatic carboxylic acid contains formic acid, acetic acid, propionic acid, oxalic acid, malonic acid, succinic acid, lactic acid, pyruvic acid, citric acid, fumaric acid, maleic acid, benzoic acid, salicylic acid, phthalic acid, terephthalic acid as well as salts thereof; as the aliphatic phosphoric acid, it contains a phosphoric acid ester such as, for example, hydroxy ethyl methacrylate phosphate (HEMA phosphate); as the aliphatic phosphonic acid, it contains vinyl phosphonic acid as well as salts thereof; and as the aliphatic and aromatic sulfonic acid, it contains methane sulfonic acid, benzene sulfonic acid, p-toluene sulfonic acid, sulfanilic acid as well as salts thereof.

6. The method as recited in claim 1 wherein the resin component (A) contains the organic and/or inorganic acid and/or salts and esters thereof in a quantity of 0.01% to 2.0% by weight.

7. The method as recited in claim 1 wherein the resin component (A) contains the organic and/or inorganic acid and/or salts and esters thereof in a quantity of 0.05% to 1.0% by weight.

8. The method as recited in claim 1 wherein the polymerizable resin is 38 percent by weight of resin component (A).

9. The method as recited in claim 1 wherein the viscosity of the resin component (A) is raised by the addition of the organic and/or inorganic acid and/or salts and esters thereof.

10. The method as recited in claim 1 wherein the cement is 19 percent by weight of resin component (A).

11. The method as recited in claim 1 wherein the two-component mortar compound is provided to fasten an anchor rod into a drilled hole.

12. The method as recited in claim 1 wherein resin component (A) is provided in a first container and curing component (B) is provided in a second container and pressed out of the first container and second container and mixed.

13. The method as recited in claim 12 wherein the pressing is due to a mechanical pressing force.

14. The method as recited in claim 12 wherein the pressing is due to a gas pressure.

15. The method as recited in claim 12 wherein the mixing occurs by feeding through a static mixer.

16. The method as recited in claim 15 wherein the mixed resin component (A) and curing component (B) are discharged through a nozzle into a drilled hole.

17. The method as recited in claim 12 wherein the first and second containers are in a multi-chamber cartridge or magazine.

* * * * *